United States Patent [19]

Pommers et al.

[11] 3,919,526

[45] Nov. 11, 1975

[54] SAMPLE RATE COORDINATOR AND DATA HANDLING SYSTEM

[75] Inventors: Ansis Pommers, Sunnyvale; Robert W. Lotz, Mountain View, both of Calif.

[73] Assignee: The Singer Company, New York, N.Y.

[22] Filed: Aug. 21, 1974

[21] Appl. No.: 499,273

[52] U.S. Cl. .......................... 235/61.6 A; 340/347 P

[51] Int. Cl. ........................ G06k 7/00; H03k 13/02

[58] Field of Search ... 235/61.6 A, 61.6 B, 61.11 E; 250/555, 566; 340/347 AD, 347 P

[56] References Cited

UNITED STATES PATENTS

| | | | |
|---|---|---|---|
| 3,014,650 | 12/1961 | Skelton et al. | 235/61.6 A |
| 3,168,643 | 2/1965 | Robinson | 235/61.6 A |
| 3,536,895 | 10/1970 | Dedden et al. | 235/61.6 A |
| 3,696,397 | 10/1972 | Raser | 235/61.6 A |

*Primary Examiner*—Daryl W. Cook

*Attorney, Agent, or Firm*—Paul Hentzel; James C. Kesterson

[57] ABSTRACT

A data sample rate is selected for a data base on a rotating drum. The sample rate determines the distance between samples on the data base. The sample distance is set into an adder-accumulator. As the data base is scanned, scanning pulses clock the accumulator to add the distance scanned between clock pulses to an intermediate sum held in the accumulator. The scanned distances are accumulated, causing the intermediate sum to increase by steps. Each time the intermediate sum exceeds the desired distance between samples, the accumulator activates a data sampling device for reading the data base. A remainder exists in the accumulator because the distance between sampled points is generally not a simple multiple of the distance between clocked points on the data base. That is, the encoding or timing capability of the convertor is fixed, defining fixed multiple thereof while the distance between data sampling points is selected independently of convertor capability. This mismatch or fundamental error remains in the accumulator and is added to the scan distance at the next scan pulse. The remainder or accumulating error changes by one multiple of the fundamental error at each subsequent sampling until the remainder exceeds one scan distance—the value of one step increase of the accumulator. The accumulator then activates the data sampling device one step sooner or later than usual depending on whether the accumulating error is increasing or decreasing with each overflow.

10 Claims, 3 Drawing Figures

SAMPLE RATE COORDINATOR AND DATA HANDLING SYSTEM

FIELD OF THE INVENTION

This invention relates to sampling data on a rotating drum, and more particularly to minimizing the mismatch between scan pulse rate of the drum and the sampling rate.

DESCRIPTION OF THE PRIOR ART

Heretofore the sampling rate in data readers was directly dependent on an input from the data base being read, such as encoder pulses from the drive apparatus. The sampling rate was limited to multiples of the encoder pulse rate.

It is, therefore, an object of this invention to provide a data sampling device in which the sampling rate may be determined independently of the scanning motion.

It is another object of this invention to provide a data sampling device in which the sampling rate may be varied during scanning and is a function of an external variable.

Prior art digitizer machines converted analog data bases, such as X-rays and aerial photographs, into digital data bases on magnetic tape. The data sampling rate of these digitizers had to be in synchronism with scanning motion in order to record accurately. If synchronism was not provided, accumulative error was introduced due to scanning rate drift, sampling rate drift, non-uniform drive speeds, etc. As a result the resolution of the new digital data base was tied directly to the scanning operation.

It is, therefore, an object of this invention to provide a data convertor in which resolution of the new data base is determined independently of the scanning mechanics.

SUMMARY OF THE INVENTION

Briefly, these and other objects are achieved by displaying a data base for scanning by a sampling or data reading device. The scanning device generates position related pulses at fixed scan distances. An adder-accumulator is provided for retaining an accumulating intermediate number and increasing it by the fixed scan distance in response to the scan pulses. The intermediate number increases in magnitude step fashion with each scan pulse until the number exceeds the desired sample distance. The accumulator then activates the sampling device to read the data base. A data sample is taken every time the accumulated scan distances exceeds the desired sampling distance. The fixed scan distance and desired sampling distance are determined independently and are typically not multiples or submultiples of one another. Thus, a fundamental error is introduced by the difference between the sampling distance and the multiple of the scan distance required to exceed the sampling distance. This fundamental error remains in the accumulator after activation of the sampling device and accumulates by steps equal of the fundamental error with each actiation. When the accumulating error exceeds the scan distance, the multiple scan distance required to activate the sampler device deviates by one scan distance.

BRIEF DESCRIPTION OF THE DRAWING

Further objects and advantages of the sample rate coordinator and the operation of the accumulator will become apparent from the following detailed description taken in conjunction with the drawings in which:

Referring to FIG. 1, there is shown a data base convertor 10 having a document support device such as rotating drum 12 for displaying a data base or medium 14. Medium 14 is preferably an analog type area display such as an aerial photograph, an X-ray, a topographical map, etc. However, nonanalog data mediums may be employed such as schematics and printed material. A sampler 16 reads medium 14 and provides output data to a data storage device 17 forming a new data base. A scanning system 18 is provided including a rotary drive motor 20 for turning drum 12, a traverse drive motor 22 for turning a screw 24 driving sampler 16, and a drive controller 28 for coordinating the rotary and traversing scanning motion.

Figure 1:
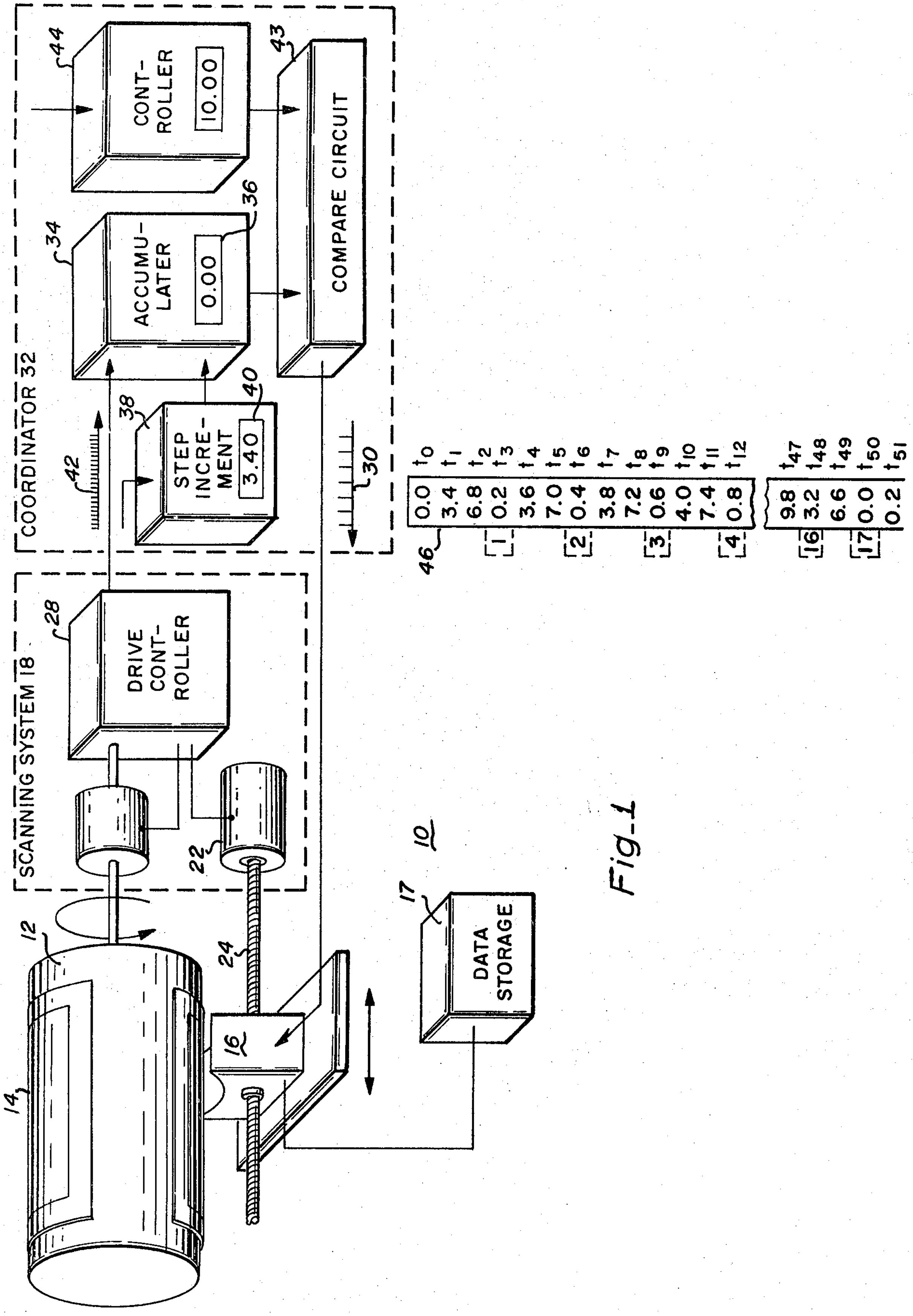
FIG. 1 is an isometric schematic view showing a general embodiment of a data convertor with the sampling rate coordinator.

Sampler 16 is activated by read pulses 30 generated by a coordinator 32 which includes a sum accumulator 34 for holding an intermediate sum 36 and an encoder increment register 38 for holding a step increment 40. Accumulator 34 is responsive to scan pulses 42 from drive controller 28 for increasing intermediate sum 36 by steps of increment 40. Increment 40 corresponds to the scanned distance on medium 14 between scan pulses 42. When sum 36 equals or exceeds the desired sample distance a COMPARE circuit 43 generates a read pulse 30 which activates sampler 16. COMPARE is determined by the desired sampling rate and establishes the desired distance between data points in the new data base. The remainder in sum 36 after COMPARE stays in accumulator 34 and is added to step increment 40 at the next encoder pulse. The remainder grows or decreases with each COMPARE until the remainder magnitude exceeds the old data base (the distance scanned between scan pulses 36 step increment 40). At this time, the number of step increments required to establish COMPARE decreases or increases by one.

Thus the sampling rate for the new data base is independent of the scanning parameters of the old data base 14. The desired sampling distance of COMPARE circuit 43 may be reduced causing more frequent COMPARES and data sampling of base 14. This provides a smaller distance between data points on the new data base—a high resolution data base. On the other hand, the setting of COMPARE circuit 43 may be increased to reduce the COMPARE and sampling rate, resulting in a low resolution data base. Some of the factors which affect the selection of the new data base resolution are the time allowed for data conversion in convertor 10, the time allowed for subsequent data handling from data storage 17, the memory capacity of storage 17, and the resolution capabilities of medium 14. Further the sampling distance setting of COMPARE circuit 43 may be changed instantaneously during scanning in response to an external computer program at input 48 or to a format on old base 14.

For illustrative purposes, FIG. 1 depicts data base convertor 10 operating with a new data base resolution of 10.0 mil and an old data base scan distance of 3.40 mil. The binary equivalent of ten has been entered into sampling interval register 44, and step increment 40 in increment register 38 has been set to the binary equivalent of 3.40. At scan time to intermediate sum 36 is 0.00. At scan time $t_1$ sum 36 increases to 3.40 in response to the first scan pulse. At $t_2$ sum 36 increases to 6.80, etc. A time vs content table 46 extending below accumulator 34 shows the numerical value of accumulating sum 36 as accumulator 34 is clocked by scan pulses 42. At $t_3$ sum 36 is 10.2 which is greater than 10.0. Accumulator 34 reaches COMPARE on the third step and actuates sampler 16. The ratio (R) of the sampling distance (COMPARE) to step increment 40 (STEP) is:

$$R = \frac{\text{COMPARE}}{\text{STEP}} = \frac{\text{sampling distance}}{\text{scan distance}} = \frac{10.0 \text{ mil}}{3.4 \text{ mil}} = 2.94$$

The nearest whole integer to R is 3, establishing the number (N) of step increments which usually occur between COMPARES. Because R at 2.94 is slightly less than N at 3, accumulator 34 will periodically reach COMPARE in only two steps.

During $t_3$ a remainder of 0.20 mil is held in accumulator 34 and then added to the 3.40 mil step increment at $t_4$ causing sum 36 to be 3.60 mil. The 0.20 remainder is the fundamental error (Ef) between the 10.00 mil sampling interval and the third multiple of the 3.40 scan distance, and is calculated:

$$Ef = N(\text{STEP}) - \text{COMPARE} = 3(3.34) - 10.0 = 0.20 \text{ mil}$$

The N of 3 and the *Ef* of 0.20 of the FIG. 1 example are illustrative only. In actual practice, as will be seen in FIG. 2, N is much larger, STEP is much smaller, and Ef becomes very small. The remainder increases by the fundamental error Ef with each COMPARE. At $t_6$ accumulator 34 COMPARES leaving a 0.40 remainder. At $t_9$ COMPARE occurs again leaving a 0.60 remainder. This accumulating error (*Ea*) increases towards a maximum value (Emax) which is slightly greater than the 3.40 mil step increment causing the next COMPARE to be foreshortened having one less step. The number of COMPARES between foreshortened COMPARES defines the period (P) of accumulator 34. P is calculated:

$$P = \frac{\text{STEP}}{Ef} = \frac{3.40 \text{ mil}}{0.20 \text{ mil}} = 17$$

and occurs when:

STEP-Ef < Ea < STEP-3.20 < Ea < 3.40

Emax = STEP = 3.40

The first 16 COMPARES of each period have three steps each and the seventeenth COMPARE has two steps. The first P begins at $t_0$ and the second P begins fifty scan pulses later and $t_{50}$ ($16 \times 3 + 2 = 50$). Accumulator 34 has a double accumulation function. On a short term basis, accumulator 34 accumulates step increments into intermediate sum 36 between COMPARES, and on a long term basis accumulator 34 accumulates error in the remainder between periods.

The data in the new data base varies by this inherent accumulating error from the old data in medium 14. Each data sample recorded in storage device 17 is within the maximum accumulating error Emax of the corresponding data in medium 14. The smallest accumulating error Ea occurs at the end of each period P on the foreshortened COMPARE at which time most of the accumulating error EA is eliminated by the foreshortening. The accumulating error Ea gradually increases thereafter approaching Emax until the foreshortened COMPARE at the end of the period.

The mechanics of drum 12, sampler 16, data storage 17 and scanning system 18 are disclosed in more detail in U.S. Pat. application Ser. No. 499,339 entitled, "Rotary Data Base Convertor with Air Bearing" by Howard Jarmy; and in U.S. Pat. application Ser. No. 499,200 entitled "Rotatry Data Base Convertor with Flexible Data Base" by Charles Hauber, both filed herewith and assigned to the present assignee.

Figure 2:
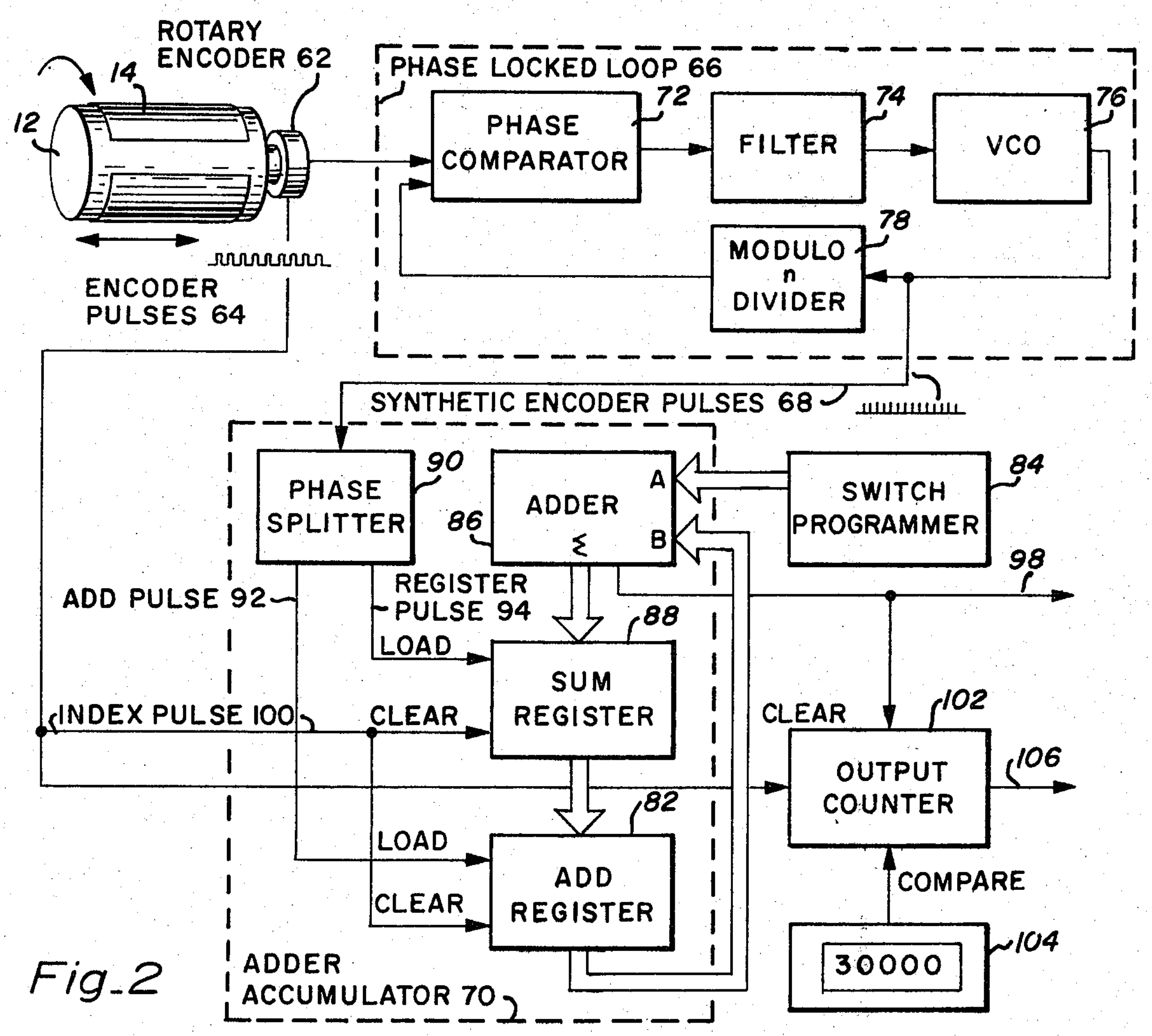
FIG. 2 is a detailed block diagram of the coordinator with a phase locked loop for minimizing the fundamental error.

FIG. 2 shows a modified data convertor 60 having a rotary encoder 62 mounted on the same shaft as drum 12 for directly determining the scanned distances on data medium 14. Encoder 62 generates a train of generally equally spaced encoder pulses 64. Each encoder pulse represents an exact scanned distance on drum 12; but the pulse rate (the spacing between the pulses) varies somewhat as the rpm of drum 12 drifts.

The frequency of encoder pulses 64 is multiplied by a phase locked loop 66, forming synthetic encoder pulses 68 of a much higher frequency. The higher frequency synthetic pulses 68 are applied to an adder-accumulator 70 causing the accumulator to step increase at a faster rate and in much smaller step increments than encoder pulses 64 directly from encoder 62. The loop multiplier (M) may be selected over a wide range to accommodate the data matching precision requirements between old data base 14 and the new data base in storage device 17. For illustrative purposes the loop multiplier (M) in the FIG. 2 example may be set at 100. The step increment (STEP') of the FIG. 2 looped system becomes:

$$\text{STEP}' = \frac{\text{encoder distance}}{M} = \frac{3.40 \text{ mil}}{100} = .0340 \text{ mil}$$

as opposed to the FIG. 1 system where:

STEP = scan distance = 3.40 mil.

The smaller STEP' yields a more accurate fit of whole STEP's for a single sampling distance. The number (N') of Adder 86 STEP's between data samples is:

$$R' = \frac{\text{COMPARE}}{\text{STEP}'} = \frac{10.00}{.034} = 294.1$$

and N' becomes 294 (the closest whole interger to R'). The fundamental error *Ef* of accumulator 70 becomes:

$$Ef = N'(\text{STEP}') - 10.00 = = 294(.034) - 10.00 = 9.996 - 10.000 = -.004 \text{ mil,}$$

which is five times smaller the Ef = 0.020 of the FIG. 1 embodiment without phase looked loop 66. The negative value of *Ef* means that *Ea'* decreases by *Ef* with each step or add cycle of accumulator 70, and the last COMPARE of each period has one extra cycle. The accumulating error Ea' varies between:

$$\text{STEP}' < Ea' < \text{STEP}' + Ef' \qquad \text{STEP}' - Ef' < Ea' < \text{STEP}'$$

$$.034 < Ea' < .034 - .004 \qquad .034 + .004 < Ea' < .034$$

-continued $Ea' = 0.032 \pm .002$ $Ea' = .032 \pm .002$ and $Emax' = STEP' = 0.034$ The period P' is:

$$P' = \frac{STEP'}{Ef} = \frac{0.034}{.004} = 8.5$$

(which becomes alternatively 8 and 9, the whole numbers closest to 8.5)

The fractional P' means that every other period P' starting with the first contains 9 COMPARE cycles of 294 steps each, except the ninth one which has 295 due to the negative Ea'. The alternative periods P' contain eight COMPARE cycles, seven with 294 steps and the eighth one with 295 steps.

Phase locked loop 66 is formed by phase comparator 72, a filter 74, a voltage controlled oscillator 76, and a divider 78. Phase comparator 72 compares the frequency of synthetic pulses 68 to the frequency of encoder pulses 64. The output of comparator 72 is filtered by filter 74 to remove the sample frequency and then applied to VCO 76. VCO 76 oscillates at a frequency responsive to the voltage input magnitude. The frequency of oscilliation is divided by module divider 78 and returned as feedback to phase comparator 72. The frequency of oscilliation also forms synthetic pulses 68 into adder-accumulator 70. A more detailed explanation of the operation and applications of phase locked loops may be found in a text by Floyd M. Gardner, entitled, "Phaselock Techniques" published by John Wiley & Sons, copyright 1966; and also in a Motorola Semiconductor Products, Inc. application note AN-535, by Garth Nash, entitled, "Phase-Locked Loop Design Fundamentals," copyright 1970.

An example of convertor 70 capable of handling large X-rays or topographical maps 30 × 30 may involve a drum 7.5000000 inches in radius. A drum speed of 15 rpm is suitable for such a device. Encoders of 5000 counts per revolution are within the present state-of-the-art, and in this example would generate an encoder pulse rate of 1,250 counts per second at 9.4247779 mils per step. A one mil sample rate provides a new data base having a one mil resolution which is adequate for may applications. An N' of 25 STEP's per COMPARE requires a loop multiplier M=236 (M=M×STEP=25×9.4227779=235.6194475) and results in a STEP' (Step increment from switch programmer 84) of:

In actual practice the binary STEP' increment of accumulator 70 may be determined empirically by operating the convertor and adjusting STEP' till the minimum Ef' is obtained. The operator is then not required to know the radius of the drum to eight decimal places.

Figure 3:
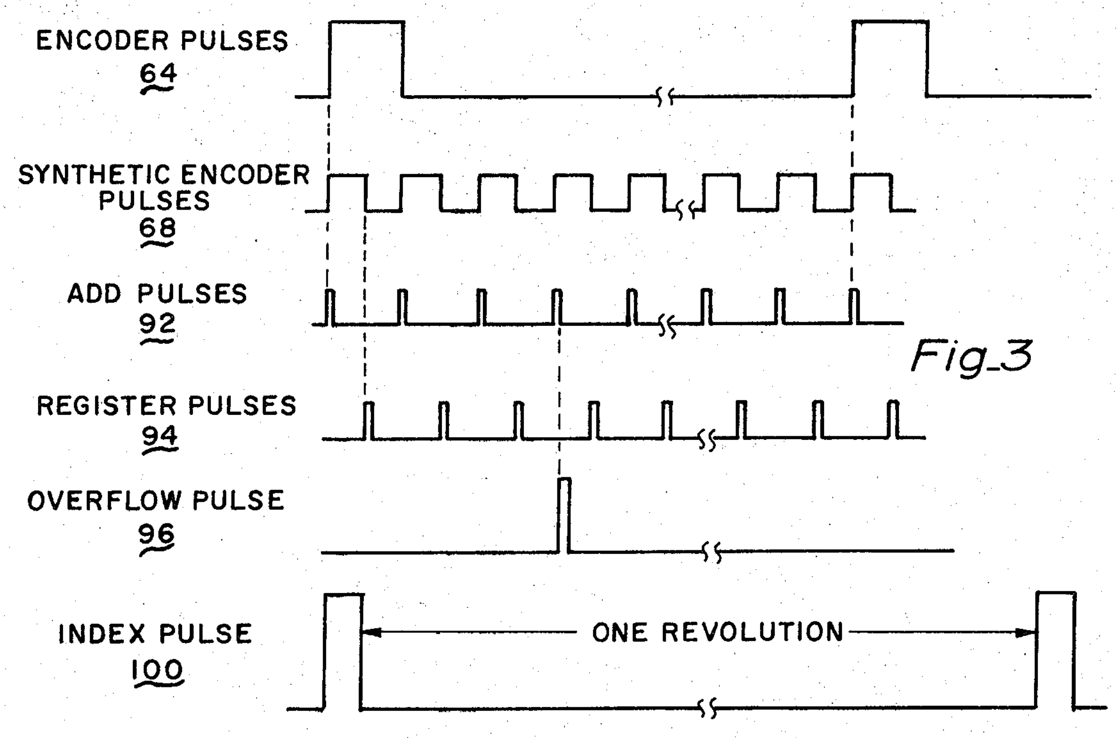
FIG. 3 is a timing diagram showing the waveforms of the FIG. 2 coordinator.

FIGS. 2 and 3 illustrates one example of how accumulator 70 may be organized. Accumulator 70 is formed by an add register 82 for holding the intermediate number, a switch programmer 84 for introducing the step increment, an adder 86 for adding the step increment to the intermediate number, and a sum register 88 for receiving the sum of the intermediate number and the step increment. A phase splitter 90 converts synthetic encoder pulses 68 into a train of add pulses 92 and register sum pulses 94 as shown in the timing diagram of FIG. 3. Add pulses 92 are generated by the positive going leading edge of each synthetic pulse 68, and load the intermediate number held in add register 82 into adder 86.

Adder 86 spontaneously adds the step increment and forwards the sum to sum register 88. Sum pulses 94 are generated by the negative going trailing edge of each synthetic pulse 68, and load the sum held in sum register 88 into add register 82. Each add pulse 92 initiates a step cycle by activating adder 86, and each sum pulse 94 completes the step cycle by advancing the intermediate sum to add register 82. When adder 86 overflows due to the increasing size of the intermediate number, sampler 16 is activated by an overflow pulse 96 from adder output 98. The residue of the intermediate number is forwarded to sum register 88 with each overflow as the accumulative error Ea.

The sampling rate of accumulator 70 may be varied by varying the capacity of adder 86. Decreasing the number of digits in adder 86 causes more frequent overflows resulting in a higher sampling rate. The sampling rate may also be increased by shifting the binary decimal point of adder 86 to the left relative to the increment step in switch programmer 84. A more precise control of the sampling rate may be obtained by varying the step increment may be varied to obtain a new sampling rate, or to compensate for a change in the scanned distance represented by a single encoder pulse. It is not required that both the step increment and the overflow point (or the COMPARE point in FIG. 1) be variable. If either of these quantities may be varied then various N's may be established.

Accumulator 70 is synchronized with the rotation of drum 12 by an index pulse 100 from encoder 62 which is generated at the beginning of each drum revolution. Index pulse 100 clears both add register 82 and sum register 88 eliminating the accumulating error Ea.

$$STEP' = \frac{\text{encoder distance}}{M} = \frac{9.4247779 \text{ mils}}{236} = .0399354998 \text{ mils}$$

The binary equivalent of the above decimal STEP' is the 24 bit number 0./0000/1001/1110/0111/0100/1100. If this STEP' is fully entered as the step increment of accumulator 70, the fundamental error Ef' becomes:

$$Ef = N \times STEP' - COMPARE = 25 \times 0.0399354998 - 1.00000000 = 0.998383950 - 1.00000000$$

$$Ef = .0016176050 \text{ mils}$$

However, if accumulator 70 does not have a step increment register with sufficient binary places to hold the binary equivalent of STEP' above, the *Ef* is greater.

Thus, the scanning of data medium 14 begins at the same position each revolution, and with the same zero accumulating error. A data sample taken coincidentally with the index pulse will have no accumulating error. Each subsequent sampling error must be within the accumulating error range of more than (the step increment) but less than (the step increment plus the fundamental error Ef). Clearly, accumulator 70 may be synchronized and cleared more frequently than once each rotation. If desired, index pulses may be provided to coincide with changes in data format, or with the beginning of each section of a multipicture data base.

An output counter 102 responsive to the sample pluses at output 98 is provided in order to calibrate convertor system 60 and normalize the new data base. The desired number of sample points on drum 12 for each rotation (the normalized number of samples) is entered into a calibrate register 104. For a film which is supposed to have a wrapped dimension of thirty inches, the desired number of samples is 30,000 (1 per mil). During scanning of drum 12, output counter 102 compares the current number of counts to the entry in calibrate register 104. When COMPARE is attained, a pulse appears at output 106 of counter 102. By adjusting switch programmer 84, the COMPARE pulse at output 106 may be brought to coincidence with the last sample pulse fixing the total counts per scan at 30,000. This normalizing procedure permits the new data base to a uniform number of data samples, notwithstanding various errors such as expansion and contraction of data medium 14.

Clearly, various changes may be made in the structure and embodiments shown herein without departing from the concept of the present invention. For instance, a flat support structure with *x-y* positioning capablilites for sampler 16 could be substituted for drum 12 to support and display medium 14. Further, the data image may be projected onto a transparent scanning screen from a wide variety of data bases including a real event. Accordingly, the scope of the invention should be determined by the wording of the following claims and their legal equivalents.

We claim as our invention:

1. An apparatus for converting existing data into digital form, comprising:

annular rotating display means adapted to display the existing data;

sampling means for reading the existing data when activated;

scanning means for establishing relative motion between the existing data on the annular display means and the sampling means; and an accumulator for holding an intermediate number which changes in magnitude by steps in response to the scanning means, each time the intermediate number changes by a required amount the accumulator activates the sampling means.

2. The apparatus of claim 1, wherein the intermediate number increases in magnitude by steps in response to the scanning means and is reduced at each sampling means activation by the amount required to activate the sampling means leaving a remainder which forms the initial magnitude of a new intermediate number, which continues to increase by steps in response to the scanning means.

3. The apparatus of claim 2, wherein the accumulator has a COMPARE circuit which compares the intermediate number with a predetermined number, and which activates the sampling means each time the intermediate number equals or exceeds the predetermined number.

4. The apparatus of claim 2, wherein the accumulator overflows to activate the sampling means each time the intermediate number exceeds the capacity of the accumulator.

5. The apparatus of claim 2, further comprising a step controller for determining the magnitude of each step increase of the intermediate sum.

6. The apparatus of claim 2, wherein the magnitude of the step increase of the intermediate sum is fixed and corresponds to the distance on the original data medium which is scanned between each step increase.

7. The apparatus of claim 2, wherein the scanning means provides clock signals to the accumulator to cause the step changes in the magnitude of the intermediate number.

8. The apparatus of claim 7, wherein the scanning means comprises stepping motor means responsive to the clock signals for establishing the relative motion between the sampling means and the annular display means.

9. The apparatus of claim 2, wherein the scanning means comprises an encoder responsive to the distance scanned for providing signals to the accumulator to cause the step increases in the intermediate number.

10. The apparatus of claim 9, wherein a phase locked loop circuit is provided responsive to the encoder for providing signals to the accumulator to cause the step increases in the intermediate number.

* * * * *